(12) United States Patent
Hong et al.

(10) Patent No.: US 9,358,522 B2
(45) Date of Patent: Jun. 7, 2016

(54) COMPOSITE MEDIUM FOR SIMULTANEOUS REMOVAL OF CATIONIC AND ANIONIC HEAVY METALS AND METHOD FOR MANUFACTURING THE SAME

(71) Applicant: KOREA INSTITUTE OF SCIENCE AND TECHNOLOGY, Seoul (KR)

(72) Inventors: Seok Won Hong, Seoul (KR); Sang Hyup Lee, Gunpo-si (KR); Jae Woo Choi, Seoul (KR); Seung Gun Chung, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 669 days.

(21) Appl. No.: 13/667,797

(22) Filed: Nov. 2, 2012

(65) Prior Publication Data

US 2013/0203585 A1 Aug. 8, 2013

(30) Foreign Application Priority Data

Feb. 6, 2012 (KR) ........................ 10-2012-0011776

(51) Int. Cl.
| | |
|---|---|
| *B01J 20/18* | (2006.01) |
| *B01J 20/28* | (2006.01) |
| *B01J 20/22* | (2006.01) |
| *B01J 20/285* | (2006.01) |
| *B01J 20/02* | (2006.01) |
| *B01J 20/24* | (2006.01) |
| *B01J 20/06* | (2006.01) |
| *B01J 20/30* | (2006.01) |
| *B01J 20/32* | (2006.01) |
| *C02F 1/28* | (2006.01) |
| *C02F 101/20* | (2006.01) |

(52) U.S. Cl.
CPC ........ *B01J 20/28019* (2013.01); *B01J 20/0229* (2013.01); *B01J 20/06* (2013.01); *B01J 20/18* (2013.01); *B01J 20/22* (2013.01); *B01J 20/223* (2013.01); *B01J 20/24* (2013.01); *B01J 20/2803* (2013.01); *B01J 20/285* (2013.01); *B01J 20/3014* (2013.01); *B01J 20/3078* (2013.01); *B01J 20/3085* (2013.01); *B01J 20/3204* (2013.01); *B01J 20/3257* (2013.01); *C02F 1/288* (2013.01); *C02F 1/281* (2013.01); *C02F 1/286* (2013.01); *C02F 2101/20* (2013.01)

(58) Field of Classification Search
USPC ........ 502/60, 62, 74, 159, 401, 404, 406, 407
See application file for complete search history.

(56) References Cited

U.S. PATENT DOCUMENTS

2003/0196960 A1 10/2003 Hughes

FOREIGN PATENT DOCUMENTS

| | | |
|---|---|---|
| JP | 2007-237097 | 9/2007 |
| JP | 2009-256394 A | 11/2009 |
| KR | 10-0380548 | 4/2003 |
| KR | 10-2005-0055659 | 6/2005 |
| KR | 10-0553179 | 2/2006 |
| KR | 10-0857352 | 9/2008 |
| KR | 10-1092377 B1 | 12/2011 |
| KR | 10-2012-0087551 A | 8/2012 |

OTHER PUBLICATIONS

Zhaohui Li et al. "Removal of Arsenic from Water Using Fe-Exchanged Natural Zeolite," Journal of Hazardous Materials 187, Jan. 14, 2011, pp. 318-323 (6 pages, in English).

*Primary Examiner* — Elizabeth Wood
(74) *Attorney, Agent, or Firm* — NSIP Law

(57) ABSTRACT

A composite medium and method thereof for simultaneous removal of cationic and anionic heavy metals are provided to remove cationic and anionic heavy metals effectively. The method includes dissolving sodium alginate powder into deionized water to provide an alginate solution, and introducing amine group-supported mesoporous iron oxide and synthetic zeolite into the alginate solution and kneading the resultant mixture. The method also includes adding the alginate solution mixed with the mesoporous iron oxide and synthetic zeolite dropwise to an aqueous calcium chloride solution so that each drop of alginate solution is cured to form a bead-like composite medium, and vacuum drying the bead-like composite medium to remove water present in the composite medium, while the mesoporous iron oxide and synthetic zeolite are moved from the inside of the composite medium toward the surface of the composite medium.

2 Claims, 1 Drawing Sheet

COMPOSITE MEDIUM FOR SIMULTANEOUS REMOVAL OF CATIONIC AND ANIONIC HEAVY METALS AND METHOD FOR MANUFACTURING THE SAME

CROSS-REFERENCE TO RELATED APPLICATION

This application claims priority to Korean Patent Application No. 10-2012-0011776, filed on Feb. 6, 2012, and all the benefits accruing therefrom under 35 U.S.C. §119, the contents of which in its entirety are herein incorporated by reference.

BACKGROUND

1. Field

The present disclosure relates to a composite medium for simultaneous removal of cationic and anionic heavy metals and a method for manufacturing the same. More particularly, the present disclosure relates to a composite medium for simultaneous removal of cationic and anionic heavy metals, capable of removing cationic and anionic heavy metals effectively, and a method for manufacturing the same.

2. Description of the Related Art

Wastewater contains various heavy metals in addition to organic materials, and such heavy metals are not removed by conventional biological methods for treating wastewater. Thus, adsorbents have been used to remove such heavy metals.

Active studies have been conducted about adsorbents capable of adsorbing and removing inorganic materials, such as heavy metals. Typical examples of such studies include a method for removing divalent heavy metals, such as zinc (Zn), cadmium (Cd) or the like, using hematite (Jeon et al., Water Research, Vol. 38, 2499-2504), a method for removing lead (Pb) and copper (Cu) using gellan gum gel beads (Lazaro et al., Water Research, Vol. 37, 2118-2126), or the like. In addition, as a typical example of methods for removing anionic heavy metals, such as arsenic and chrome, Korean Patent Registration No. 10-0553179 discloses a method for removing heavy metals by using alumina.

The above-mentioned methods for removing heavy metals merely allow selective removal of cationic heavy metals or anionic heavy metals. As a method for removing cationic heavy metals and anionic heavy metals, a method for removing mercury (Hg) and cadmium (Cd) by using Ca-alginate is suggested (Arica et al., Journal of Hazardous Materials, B109, 191-199). However, the method shows insufficient removal efficiency.

PRIOR ART DOCUMENTS

Patent Documents

Korean Patent Registration No. 10-0553179

SUMMARY

The present disclosure is directed to providing a composite medium for simultaneous removal of cationic and anionic heavy metals, capable of removing cationic and anionic heavy metals effectively at the same time, and a method for manufacturing the same.

In one aspect, there is provided a method for manufacturing a composite medium for simultaneous removal of cationic and anionic heavy metals, including: dissolving sodium alginate powder into deionized water to provide an alginate solution; introducing mesoporous iron oxide and synthetic zeolite into the alginate solution and kneading the resultant mixture; adding the alginate solution mixed with the mesoporous iron oxide and synthetic zeolite dropwise to an aqueous calcium chloride solution so that each drop of alginate solution is cured to form a bead-like composite medium; and vacuum drying the bead-like composite medium to remove water present in the composite medium, while the mesoporous iron oxide and synthetic zeolite are moved from the inside of the composite medium toward the surface of the composite medium. Through the vacuum drying, micropores are formed on the surface of and inside of the composite medium so that contaminants may be adsorbed to the inside of the composite medium.

The mesoporous iron oxide may be prepared by a process including mixing an iron chloride solution with an anionic surfactant, and allowing the mixed iron chloride solution to react with a solution of hydrogen peroxide. In addition, the method may further include attaching amine groups to the mesoporous iron oxide formed from the reaction of the mixed iron oxide solution with a solution of hydrogen peroxide. Further, the attaching amine groups to the mesoporous iron oxide may be carried out by dispersing mesoporous iron oxide into anhydrous toluene, and allowing the solution in which the mesoporous iron oxide is dispersed to react with 3-aminopropyltriethoxysilane (APTES).

Particularly, APTES and the mesoporous iron oxide may be mixed at a weight ratio of 1-1.5:1, and the anionic surfactant may be sodium dodecylsulfate.

In another aspect, there is provided a composite medium for simultaneous removal of cationic and anionic heavy metals, obtained by mixing mesoporous iron oxide, synthetic zeolite and alginate, and curing the resultant mixture in an aqueous calcium chloride solution, followed by vacuum drying, wherein the mesoporous iron oxide has amine groups formed on the surface thereof.

The composite medium for simultaneous removal of cationic and anionic heavy metals and the method for manufacturing the same disclosed herein have the following effects.

Since mesoporous iron oxide on which amine groups are supported and synthetic zeolite are fixed together to the composite medium, it is possible to remove cationic heavy metals through the synthetic zeolite and to remove anionic heavy metals through the mesoporous iron oxide effectively at the same time.

In addition, since cationic and anionic heavy metals present together in sewage and wastewater are removed by a single treatment process, it is possible to simplify the processes required to treat sewage and wastewater, and thus to improve the cost efficiency.

BRIEF DESCRIPTION OF THE DRAWINGS

The above and other aspects, features and advantages of the disclosed exemplary embodiments will be more apparent from the following detailed description taken in conjunction with the accompanying drawings in which.

DETAILED DESCRIPTION

Figure 1:
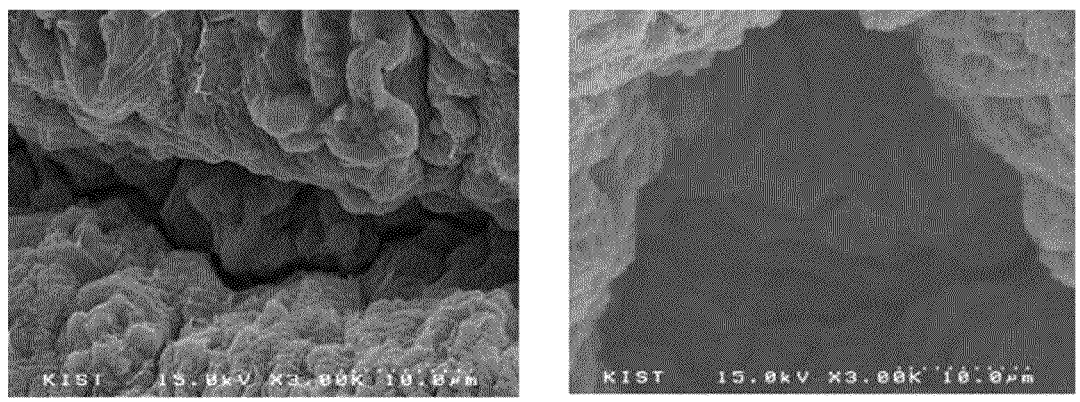
FIG. 1 is a scanning electron microscopy (SEM) image showing the surface of the composite medium obtained according to an embodiment.

Exemplary embodiments now will be described more fully hereinafter with reference to the accompanying drawings, in which exemplary embodiments are shown.

As used herein, $FeO_x$ is amorphous iron oxide, and may be any one of ferrous oxide (FeO) and ferric oxide ($Fe_2O_3$), or a mixture thereof.

The composite medium for simultaneous removal of cationic and anionic heavy metals disclosed herein includes a combination of amine group-supported mesoporous iron oxide, synthetic zeolite and alginate powder.

The mesoporous iron oxide (meso-$FeO_x$) has a large number of pores and large specific surface area, and serves to collect anionic heavy metals through hydrogen ion exchange. To increase adsorption efficiency of anionic heavy metals, amine groups may be further attached to the surface of the mesoporous iron oxide (meso-$FeO_x$), wherein the amine groups serve to collect anionic heavy metals.

The synthetic zeolite serves to adsorb cationic heavy metals.

The alginate powder determines the external shape of the composite medium, and is bound to calcium chloride ($CaCl_2$) to fix the mesoporous iron oxide (meso-$FeO_x$) and the synthetic zeolite, while serving as an adsorbent for some heavy metals. The alginate powder that may be used herein includes sodium alginate powder.

A method for manufacturing the composite medium including mesoporous iron oxide (meso-$FeO_x$), synthetic zeolite and alginate powder, includes: preparing an alginate solution, mesoporous iron oxide (meso-$FeO_x$) and synthetic zeolite, separately; providing a mixed solution of the mesoporous iron oxide (meso-$FeO_x$), synthetic zeolite and alginate; forming a bead-like composite medium; and vacuum drying the composite medium.

In detail, first of all, an alginate solution, mesoporous iron oxide (meso-$FeO_x$) and synthetic zeolite are prepared separately in the manner as described hereinafter.

The alginate solution is obtained by dissolving sodium alginate powder into deionized water. To ensure stable hardness of a composite medium, the alginate solution may have a concentration of about 5-30 w/v %.

The mesoporous iron oxide (meso-$FeO_x$) is formed by mixing a solution of ferrous chloride ($FeCl_2$) with an anionic surfactant, followed by reaction with a solution of hydrogen peroxide ($H_2O_2$). As an anionic surfactant, sodium dodecylsulfate (SDS) may be used.

When attaching amine groups to the mesoporous iron oxide (meso-$FeO_x$), an amination process is added. Particularly, mesoporous iron oxide (meso-$FeO_x$) is dispersed in anhydrous toluene, and an amine precursor, 3-aminopropyltriethoxysilane (APTES) is further introduced thereto to perform a reaction. After the reaction, amine groups are formed on the surface of the mesoporous iron oxide (meso-$FeO_x$). To increase the amination efficiency, APTES may have a weight ratio of 1-1.5:1 based on the mesoporous iron oxide (meso-$FeO_x$). In addition, it is required that the amination is carried out under inert gas atmosphere to inhibit evaporation of anhydrous toluene during the amination. When anhydrous toluene is evaporated, undesired agglomeration of mesoporous iron oxide (meso-$FeO_x$) may occur.

The synthetic zeolite may be commercially available synthetic zeolite.

Next, mesoporous iron oxide (meso-$FeO_x$) and synthetic zeolite are introduced to the alginate solution and the resultant mixture is kneaded for a predetermined time to provide a mixed solution of mesoporous iron oxide (meso-$FeO_x$), synthetic zeolite and alginate. The mixed solution of mesoporous iron oxide (meso-$FeO_x$), synthetic zeolite and alginate may have a weight ratio of mesoporous iron oxide (meso-$FeO_x$): synthetic zeolite of 3:7-4:6, and the amount of alginate powder may be 3-5 times of the amount of mesoporous iron oxide (meso-$FeO_x$) or synthetic zeolite. When the weight ratio of iron oxide to synthetic zeolite in the mixed solution is 3:7-4:6, it is possible to maximize the anionic and cationic heavy metal removal efficiency.

Then, the mixed solution of mesoporous iron oxide (meso-$FeO_x$), synthetic zeolite and alginate is added dropwise to an aqueous calcium chloride ($CaCl_2$) solution to form a bead-like composite medium. An aqueous barium chloride ($BaCl_2$) solution may be used instead of an aqueous calcium chloride ($CaCl_2$) solution. To ensure hardness of the composite medium, the aqueous calcium chloride or barium chloride solution may have a concentration of about 2-6 w/v %.

Finally, the composite medium is vacuum dried at a temperature of 60-70° C. Through the vacuum drying, water present inside the composite medium is removed, while the mesoporous iron oxide (meso-$FeO_x$) and synthetic zeolite powder are moved toward the surface of the composite medium. In addition, through the vacuum drying, micropores are formed on the surface of and inside of the composite medium. Thus, it is possible to adsorb contaminants not only at the surface of the composite medium but also at the inner part thereof.

The examples of the composite medium for simultaneous removal of cationic and anionic heavy metals and the experiment for determining the heavy metal removal efficiency thereof will now be described. The following examples are for illustrative purposes only and not intended to limit the scope of the present disclosure.

Example 1

Preparation of Mesoporous Iron Oxide (Meso-$FeO_x$)

First, 200 mL of 0.2M ferrous chloride ($FeCl_2$) and 45 mL of 0.08M sodium dodecylsulfate (SDS) are mixed with each other, followed by agitation for 6 hours. Next, 50 mL of 0.3M hydrogen peroxide ($H_2O_2$) solution is added dropwise to the agitated solution to perform a reaction. After the addition of hydrogen peroxide solution, the resultant mixture is agitated for 1 hour.

Then, the mixture is subjected to solid-liquid separation through a centrifugal separation system (3000 rpm, 15 minutes) to extract a solid material. The solid material is washed three times with distilled water and further subjected to centrifugal separation, thereby extracting a solid material. After that, the solid material is dried at 100° C. for 4 hours to obtain light brown-colored mesoporous iron oxide (meso-$FeO_x$).

Example 2

Amination of Mesoporous Iron Oxide (Meso-$FeO_x$)

The mesoporous iron oxide (meso-$FeO_x$) obtained from Example 1 is introduced to anhydrous toluene under argon gas atmosphere and dispersed uniformly therein. Next, 3-aminopropyltriethoxysilane (APTES) is introduced thereto at the same weight proportion as the mesoporous iron oxide (meso-$FeO_x$) to form amine groups on the surface of the mesoporous iron oxide (meso-$FeO_x$). Then, the mesoporous iron oxide (meso-$FeO_x$) on which amine groups are formed is filtered by a filtering system, washed three times with toluene, and dried in a vacuum oven at 50° C. for 10 hours.

Example 3

Preparation of Composite Medium

First, 16 g of sodium alginate is introduced into 400 mL of sterilized deionized water and the resultant mixture is agitated for 20 hours to provide a gel-like alginate solution. It is possible to increase the temperature of deionized water or to use a hot plate to facilitate dissolution of sodium alginate. Next, the mesoporous iron oxide (meso-$FeO_x$) obtained from Example 2 and synthetic zeolite available from Jishim tech. Korea company are introduced to the alginate solution at a ratio of 4:6, followed by agitation for 20 hours, to provide a homogeneous mixture.

Figure 2:
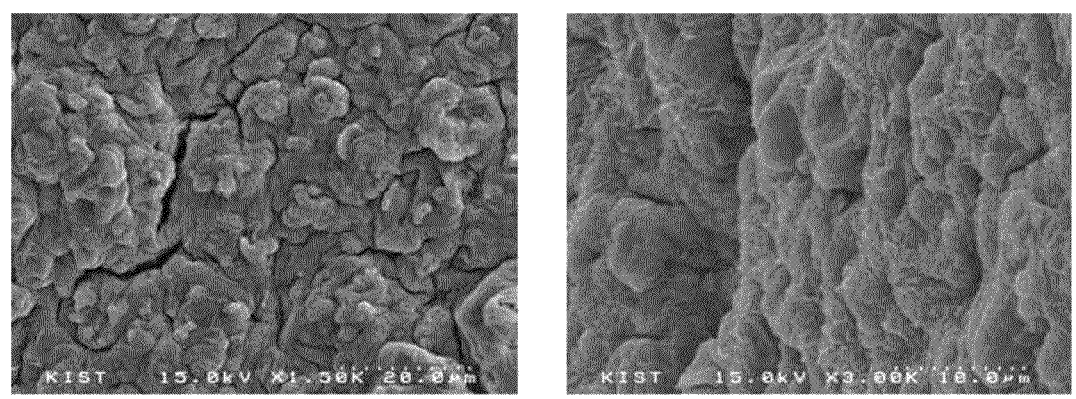
FIG. 2 is an SEM image showing the micropores that continue from the surface of the composite medium to the inside thereof according to an embodiment.

Then, a 0.5 w/v % aqueous calcium chloride ($CaCl_2$) solution is prepared, and the alginate solution containing a mixture of mesoporous iron oxide (meso-$FeO_x$) and synthetic zeolite is added dropwise to the aqueous calcium chloride solution by using a burette. The drops of alginate solution are cured in the form of spheres in the aqueous calcium chloride solution to form a composite medium. After the lapse of about 30 minutes in this state, the composite medium sinks to the bottom. In this state, the cured composite medium is removed after the lapse of additional 30 minutes, washed with deionized water, and is introduced into a vacuum oven at 60° C. The composite medium is vacuum dried in the oven under a pressure of 76 cmHg for 6 hours to provide a finished composite medium (see, FIG. 1 and FIG. 2). The composite medium has a size of about 3 mm and about 1 mm, before and after the vacuum drying, respectively.

Example 4

Test for Removal of Cationic and Anionic Heavy Metals and Results

To evaluate the composite medium disclosed herein in terms of the cationic and anionic heavy metal removal efficiency, the composite medium obtained from Example 3 and an alginate medium in which mesoporous iron oxide (meso-$FeO_x$) and synthetic zeolite are not fixed are subjected to a test for removal of cationic and anionic heavy metals.

The following Table 1 shows the test results after reacting 1 g of the composite medium of Example 3 with 20 mg/L of cadmium solution, copper solution, lead solution, arsenic solution or chrome solution for 6 hours. The following Table 2 shows the test results after reacting 1 g of an alginate medium with 20 mg/L of cadmium solution, copper solution, lead solution, arsenic solution and chrome solution for 6 hours.

TABLE 1

Cationic and Anionic Heavy Metal Removal Efficiency of Composite Medium of Example 3

| Heavy metal | | Initial concentration (mg/L) | Equilibrium concentration (mg/L) | Removal rate (%) |
|---|---|---|---|---|
| Cadmium | 1 | 19.21 | 3.351 | 82.56 |
| | 2 | | 3.335 | 82.64 |
| Copper | 1 | 20.20 | 0.783 | 96.12 |
| | 2 | | 0.933 | 95.38 |
| Lead | 1 | 19.26 | 0.122 | 99.37 |
| | 2 | | 0.064 | 99.67 |
| Arsenic | 1 | 19.54 | 3.929 | 79.89 |
| | 2 | | 3.884 | 80.01 |
| Chrome | 1 | 20.45 | 8.735 | 57.29 |
| | 2 | | 8.926 | 56.36 |

TABLE 2

Cationic and Anionic Heavy Metal Removal Efficiency of Alginate Medium

| Heavy metal | | Initial concentration (mg/L) | Equilibrium concentration (mg/L) | Removal rate (%) |
|---|---|---|---|---|
| Cadmium | 1 | 18.84 | 16.372 | 13.10 |
| | 2 | | 16.184 | 14.10 |
| Copper | 1 | 19.89 | 16.904 | 15.01 |
| | 2 | | 17.229 | 13.38 |
| Lead | 1 | 19.44 | 15.103 | 22.31 |
| | 2 | | 15.995 | 17.72 |
| Arsenic | 1 | 20.11 | 20.862 | — |
| | 2 | | 20.844 | — |
| Chrome | 1 | 20.83 | 20.851 | — |
| | 2 | | 20.975 | — |

As can be seen from the results of Table 1 and Table 2, in the case of cationic heavy metals, such as cadmium, copper and lead, they are removed partially by the alginate medium. On the contrary, the composite medium disclosed herein shows excellent removal efficiency. In addition, in the case of anionic heavy metals, such as arsenic and chrome, the composite medium in which mesoporous iron oxide (meso-$FeO_x$) and synthetic zeolite are fixed together shows significantly higher removal efficiency as compared to the alginate medium. It is thought that this results from the fact that mesoporous iron oxide (meso-$FeO_x$) is fixed in such a manner that anionic metals are removed effectively.

The composite medium disclosed herein is obtained by vacuum drying as described above. The reason why such vacuum drying is carried out is because water present inside the composite medium is removed, while the mesoporous iron oxide (meso-$FeO_x$) and synthetic zeolite powder are moved from the inner part of the composite medium to the surface thereof to improve the reactivity of the composite medium. While the mesoporous iron oxide (meso-$FeO_x$) and synthetic zeolite powder are moved from the inner part of the composite medium to the surface thereof, micropores are formed inside the composite medium (see FIG. 2), and such micropores increase adsorption of contaminants.

To evaluate the effect of vacuum drying upon the adsorption efficiency of a composite medium, a vacuum dried composite medium and a conventionally dried composite medium are subjected to an adsorption test. After the test, it can be seen that the vacuum dried composite medium shows an adsorption efficiency approximately 19% higher than the adsorption efficiency of the conventionally dried composite medium.

While the exemplary embodiments have been shown and described, it will be understood by those skilled in the art that various changes in form and details may be made thereto without departing from the spirit and scope of the present disclosure as defined by the appended claims.

What is claimed is:

1. A composite medium for simultaneous removal of cationic and anionic heavy metals, obtained by mixing mesoporous iron oxide, synthetic zeolite for adsorbing cationic heavy metals, and alginate, and curing the resultant mixture in an aqueous calcium chloride solution, followed by vacuum drying, wherein the mesoporous iron oxide has amine groups formed on the surface thereof.

2. The composite medium according to claim 1, wherein the mesoporous iron oxide is prepared by a process including: mixing an iron chloride solution with an anionic surfactant; allowing the mixed iron chloride solution to react with a solution of hydrogen peroxide; and dispersing the mesoporous iron oxide into anhydrous toluene, and allowing the solution in which the mesoporous iron oxide is dispersed to react with 3-aminopropyltriethoxysilane (APTES).

* * * * *